Dec. 8, 1959  W. F. SKILLIN  2,916,290
CHUCK WITH PIVOTED JAW

Filed Oct. 5, 1956  2 Sheets-Sheet 1

INVENTOR
WALTER F. SKILLIN
BY
ATTORNEYS

Dec. 8, 1959 W. F. SKILLIN 2,916,290
CHUCK WITH PIVOTED JAW
Filed Oct. 5, 1956 2 Sheets-Sheet 2
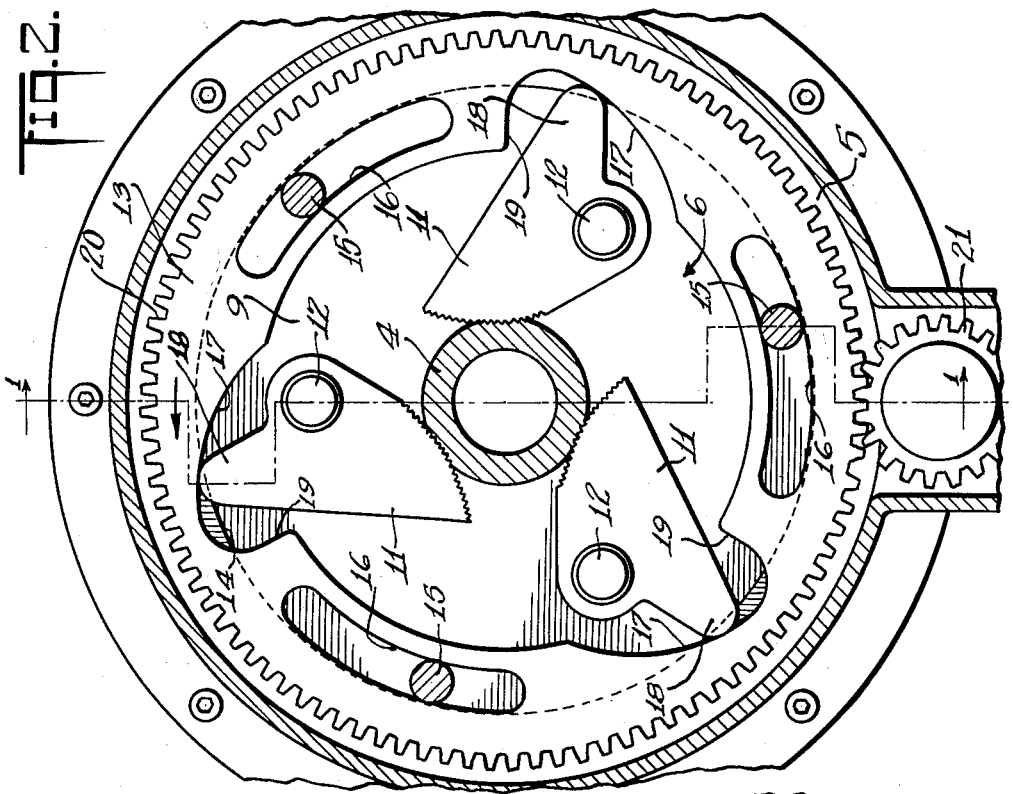
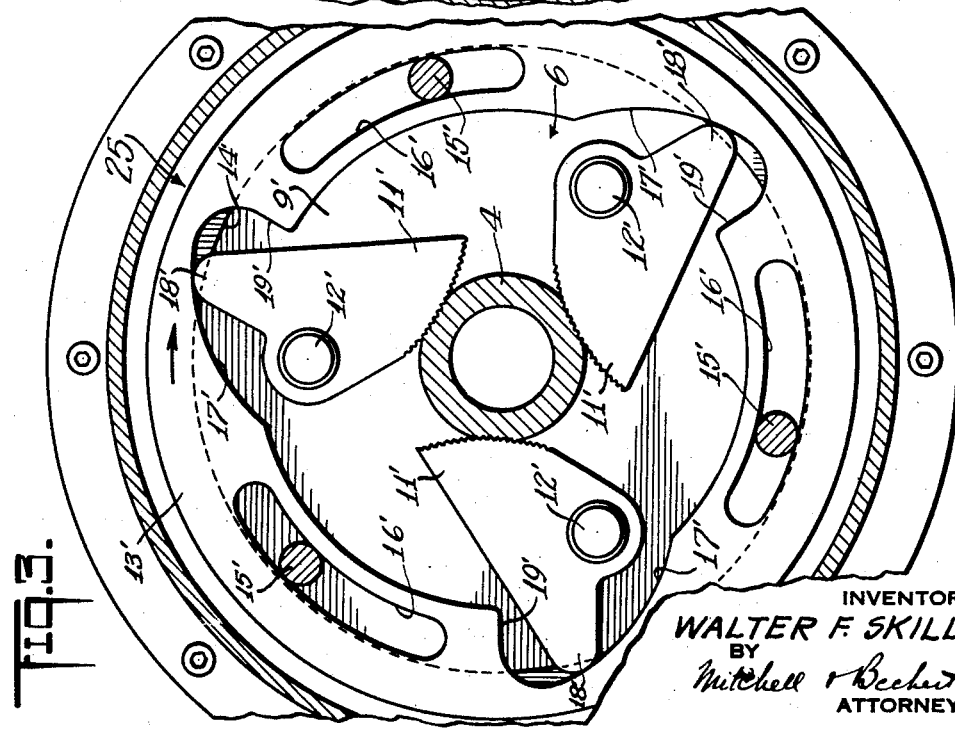
INVENTOR
WALTER F. SKILLIN
BY
Mitchell & Bechtel
ATTORNEYS

United States Patent Office 2,916,290
Patented Dec. 8, 1959

2,916,290

CHUCK WITH PIVOTED JAW

Walter F. Skillin, New Britain, Conn., assignor to Union Manufacturing Company, New Britain, Conn., a corporation of Connecticut Application October 5, 1956, Serial No. 614,159

5 Claims. (Cl. 279—106)

My invention relates to a chuck and more particularly to a pipe chuck.

In a pipe chuck, it is important to provide means for tightly gripping a work piece and for increasing the grip on the work piece as the torque thereon increases.

It is an object of my invention to provide an improved chuck wherein the gripping action of the chuck jaws increases as the torque on the work piece held thereby increases.

Another object is to provide an exceedingly simple chuck of the character indicated, which has few and easily fabricated parts.

Another object is to provide an improved chuck of the character indicated, wherein the chuck is rotated through the jaws, the body of the chuck, and the work piece carried thereby.

Another object is to provide an improved form of power chuck of the character indicated.

Still another object is to provide an improved chuck, embodying two chucks mounted in spaced relation to a chuck frame.

Other objects and various features of novelty and invention will be hereinafter pointed out or will become apparent to those skilled in the art.

Briefly stated, in a preferred form of the invention there is a chuck body with a plurality of jaws movably mounted thereon—preferably pivotally mounted. The jaws are actuated in at least one direction by means such as a cam ring, or the like, which is rotatably carried by the chuck body and which has surfaces to move the jaws upon relative rotation of the chuck body and cam ring. The cam ring may be hand operated or may form part of a gear which may be power operated.

In the drawings, which show for illustrative purposes only a preferred form of my invention:

Fig. 2 is a sectional view of a chuck substantially in the plane of the line 2—2 of Fig. 1; and Fig. 3 is a view similar to Fig. 2 but taken substantially in the plane of the line 3—3 of Fig. 1.

Figure 1:
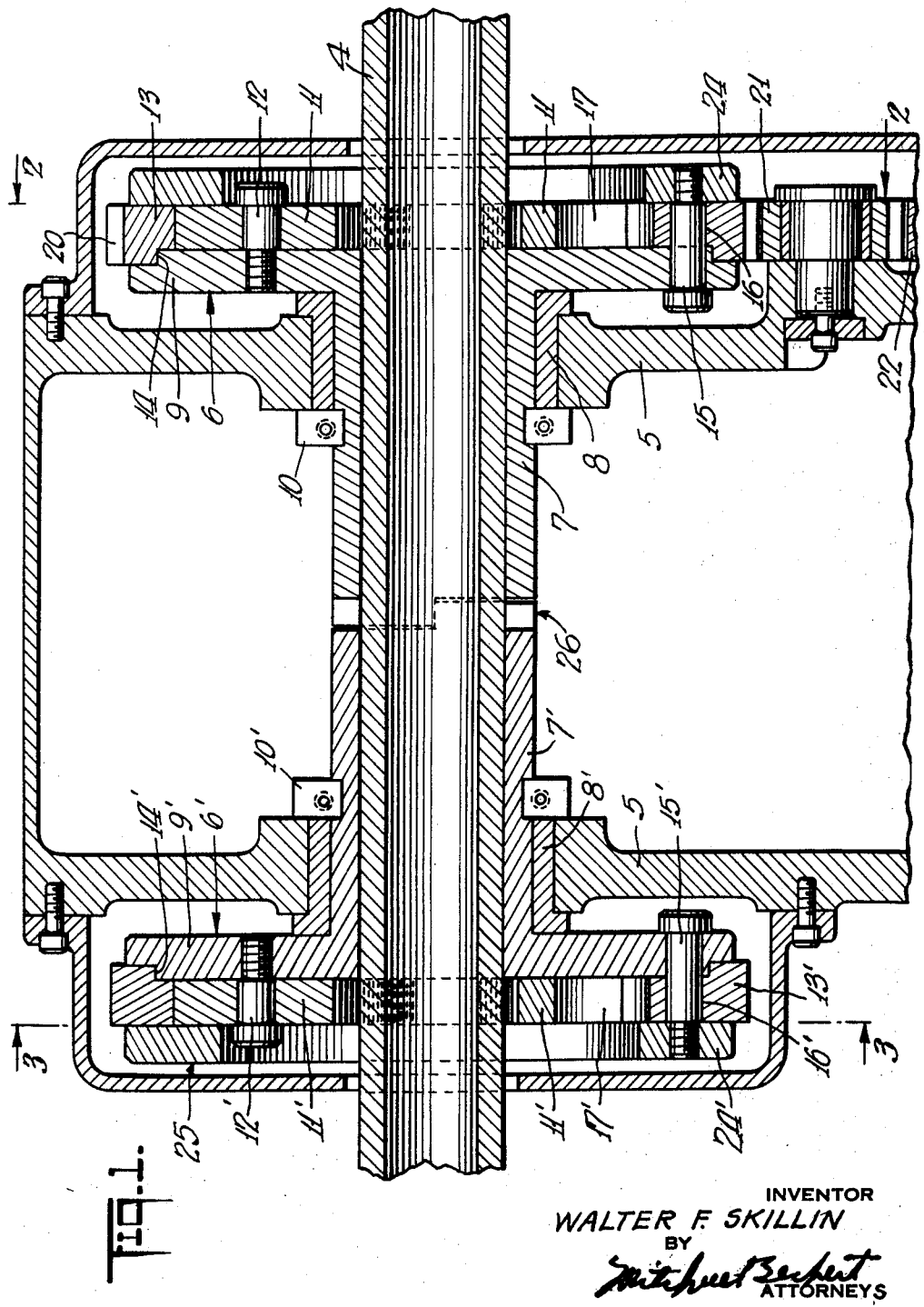
Fig. 1 is a longitudinal central section of a pipe chuck illustrating the invention and taken substantially in the planes of the line 1—1 of Fig. 2.

In the form shown, my chuck is adapted to support and hold pipe stock 4, and a substantial frame 5 carries the chuck body, designated generally 6. This chuck body may consist of a spindle portion 7 rotatably mounted in the bearing 8 of the frame 5. The spindle portion 7 has a radial flange 9 constituting the main portion of the chuck body, which flange preferably abuts the bearing 8 and is held by means of a split ring or other device 10, at the opposite side of the frame 5, as will be understood.

The body or flange 9 carries a plurality of jaws 11—11, three being shown. The jaws in the present instance are pivotally mounted on the chuck body as by means of the stepped screws 12 taking into the flange 9 and having heads holding the jaws 11—11 in place. These jaws, therefore, are pivotally mounted and may be swung in a counterclockwise direction, as viewed in Fig. 2, for gripping the work piece or, pipe 4, or may be swung in the clockwise direction for releasing the work. Work 4 of various sizes may, of course, be accommodated since the jaws have considerable latitude in their pivotal movement.

The jaws are preferably actuated by what I term a cam ring 13 mounted on a step 14, near the periphery of the chuck body, as will be clear in Fig. 1. This cam ring may be held in place by a finish or retaining ring 24 secured to the chuck body as by means of the stepped screws 15 which take into the retaining ring 24, as will also be clear in Fig. 1, and which permit rotary movement of the cam ring. The cam ring 13 is mounted for limited rotary movement relative to the chuck body and, in the form shown, I provide slots 16—16 in the cam ring which permit passage of the screws 15, whereby screws 15 may also act as limit stops for the rotation of the cam ring 13. The cam ring and jaws are provided with inter-engaging surfaces for moving the jaws in one or both directions. In the form illustrated, the cam ring has a plurality of cam surfaces 17 for engagement by cam follower or tail portions 18 formed on the jaws. Thus, when the cam ring 13 is rotated relatively to the body in a counterclockwise direction, as viewed in Fig. 2, the cam surfaces 17 engage the cam follower or tail portions 18 on the jaws, and cam the latter in counterclockwise direction (i.e. the jaw-closing direction), so that the jaws close on the pipe, or other work piece 4 in the chuck. If the cam ring 13 is rotated in the opposite direction, surfaces such as 19 thereon may engage portions of the jaws, preferably the tail portions 18 and move the jaws in the clockwise direction, which is the chuck-opening direction, so as to release the work.

The cam ring 13 may be rotated by hand, or otherwise, but in the form shown, the cam ring 13 is in the form of a gear 20 which meshes with an idler 21 and with power gear or pinion 22 so that by means of a reversible motor or the like (not shown), the cam ring may be rotated to either chuck-closing or chuck-opening direction.

It will be seen that when the ring gear is moved in counterclockwise direction, the cam surfaces 17 will engage the tails 18 on the jaws and move the same into engagement with a work piece in the chuck. When the work piece is engaged, the ring gear, of course, rotates the jaws 11 with it and the body of the chuck is rotated by the jaws through their pivots. As the torque or resistance on the work piece increases, the cam surfaces 17 will ride further up on the follower or tail surfaces 18 and cause the jaws to grip more tightly. It will be seen that the entire drive of the chuck is through the ring gear 13 and the jaws 11 to the body 6 of the chuck. The body is simply mounted for rotation in the frame bearing 8. If there is no work 4 in the chuck, the ends of the slots 16 engage the pins 15 on the chuck body and rotate the latter when the cam ring is rotated.

If it is desired to provide a chuck with a double set of chucking jaws, then a second chuck 25 may be mounted in the frame 6, as shown particularly in Figs. 1 and 3.

In its action, the second chuck 25 may be the substantial duplicate of the first-described chuck, except that, as viewed in Fig. 3, the parts appear reversed with respect to the arrangement viewed in Fig. 2. The second chuck 25 may be mounted the same as the first and consists of essentially the same parts; corresponding parts in the chuck of Fig. 3 have therefore been given the same reference numerals, with primed notation. The second or left-hand chuck 25 differs from the right-hand chuck, in that the cam ring 13', in the particular instance shown, is not of the toothed variety. The chuck spindle portions 7—7' are dogged at 26, and the parts are so arranged that after the right-hand chuck has closed or opened to result in actually driving both spindle portions 7—7' (and therefore also chuck 25), and upon suddenly braking the drive 20—21—22 (by means not shown), the momentum of the cam ring 13' tends to rotate the jaws 11' in the left-hand chuck 25 into chuck-gripping position, or ungripping position, as determined by the particular rotation caused by the chuck at the right.

It will be seen that I have provided an exceedingly simple chuck which may be a power chuck or a hand operated chuck and which will ordinarily be self gripping so as to increase the gripping force as the resistance to rotation of the work piece increases. The parts are all simple and sturdy.

While the invention has been described in considerable detail and a preferred form illustrated, it is to be understood that various changes may be made within the scope of the invention, as defined in the appended claims.

I claim:

1. In a chuck, a chuck body, a plurality of jaws movably mounted on said body, a ring gear rotatably mounted on said body, said ring gear having an arcuate slot therein, a stop carried by said body and extending into said slot to limit rotation of said ring gear on said body, said ring gear having cam means for coaction with said jaws for moving the latter, and power means for rotating said ring gear.

2. In a chuck, a frame, a chuck body, said body having a part rotatably mounted on said frame, a plurality of jaws movably mounted on said body, a cam ring rotatably mounted on said body and having surfaces for coaction with said jaws for moving the same on said body, and drive means for said chuck comprising means for rotating said cam ring whereby to move said jaws and through said jaws to rotate said chuck body.

3. In a chuck, a frame, a chuck body, said body having a part rotatably mounted on said frame, a plurality of jaws movably mounted on said body, a cam ring rotatably mounted on said body and having surfaces for coaction with said jaws for moving the same on said body, and drive means for said chuck comprising means for rotating said cam ring, said cam ring and body having coacting means to be engaged upon rotation of said cam ring whereby to rotate said body with said cam ring.

4. In a chuck, a frame, a chuck body, said body having a part rotatably mounted on said frame, a plurality of jaws movably mounted on said body, a cam ring rotatably mounted on said body and having surfaces for coaction with said jaws for moving the same on said body, and drive means for said chuck comprising means for rotating said cam ring on said chuck body whereby to move said jaws into engagement with a work piece and through said jaws to rotate said chuck body.

5. In a chuck, a frame, a chuck body having a part rotatably mounted on said frame, jaws pivotally mounted on said chuck body, a cam ring rotatably mounted on said chuck body, said cam ring and jaws having coacting parts to move said jaws on said body upon rotation of said cam ring on said body, said cam ring comprising a cam gear, a drive gear mounted on said frame and meshing with said cam gear, whereby to rotate said cam ring on said body and thereby move said jaws and through said jaws to rotate said chuck body.

References Cited in the file of this patent

UNITED STATES PATENTS

| | | |
|---|---|---|
| 1,072,142 | Miller | Sept. 2, 1913 |
| 1,171,406 | Avery | Feb. 15, 1916 |
| 1,187,920 | Muller | June 20, 1916 |
| 1,357,935 | Argetsinger | Nov. 9, 1920 |
| 1,470,158 | Garrison | Oct. 9, 1923 |
| 2,508,687 | Richter | May 23, 1950 |
| 2,635,393 | Barth | Apr. 21, 1953 |
| 2,672,780 | Schurr | Mar. 23, 1954 |
| 2,867,442 | Skillen et al. | Jan. 6, 1959 |